United States Patent
Khandekar et al.

(10) Patent No.: US 6,243,810 B1
(45) Date of Patent: Jun. 5, 2001

(54) METHOD AND APPARATUS FOR COMMUNICATING A CONFIGURATION SEQUENCE THROUGHOUT AN INTEGRATED CIRCUIT CHIP

(75) Inventors: Narendra N. Khandekar, Folsom; Steven Clohset, Sacramento, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/200,034

(22) Filed: Nov. 25, 1998

(51) Int. Cl.$^7$ .................................................. G06F 9/445
(52) U.S. Cl. .................. 713/1; 713/100; 710/20; 712/241
(58) Field of Search .................. 713/1, 2, 100; 709/201; 710/9, 20; 712/241, 224

(56) References Cited

U.S. PATENT DOCUMENTS

| | | | |
|---|---|---|---|
| 5,379,384 | * | 1/1995 | Solomon ............................... 395/325 |
| 5,522,086 | * | 5/1996 | Burton et al. .......................... 710/9 |
| 5,684,980 | * | 11/1997 | Casselman ............................ 395/500 |
| 5,802,290 | * | 9/1998 | Casselman ............................ 709/201 |
| 5,881,294 | * | 3/1999 | Downey et al. ....................... 710/260 |
| 5,988,847 | * | 8/2000 | McLaughlin et al. ................ 700/9 |
| 6,003,128 | * | 12/1999 | Tran ..................................... 712/241 |
| 6,023,440 | * | 2/2000 | Kotani et al. ..................... 365/230.03 |
| 6,023,564 | * | 2/2000 | Trimberger .......................... 395/500 |
| 6,105,105 | * | 8/2000 | Trimberger .......................... 711/103 |

* cited by examiner

Primary Examiner—Thomas Lee
Assistant Examiner—Ri Jue Mai
(74) Attorney, Agent, or Firm—Blakely, Sokoloff, Taylor & Zafman LLP

(57) ABSTRACT

A method and apparatus for communicating a configuration operation throughout an integrated circuit chip is disclosed. The present invention receives a configuration operation having a configuration word. The configuration word is stored in a defer register until the configuration word can be communicated to one or more target local configuration registers, which are the registers in which the configuration word is to be stored and/or used. During the time period during which the configuration word is stored in the defer register, subsequent operations including operations having configuration data associated with the configuration word are delayed. In one embodiment, operations are caused to retry if a configuration word is stored in the defer register. The configuration data associated with the configuration word is received after the defer register has been cleared. After the configuration data has been received, subsequent operations are blocked for a predetermined period of time. In one embodiment, the device being configured causes devices issuing operations to halt issuance of subsequent operations during the predetermined period of time.

14 Claims, 4 Drawing Sheets

METHOD AND APPARATUS FOR COMMUNICATING A CONFIGURATION SEQUENCE THROUGHOUT AN INTEGRATED CIRCUIT CHIP

FIELD OF THE INVENTION

The present invention relates to integrated circuits having one or more configuration registers. More particularly, the present invention relates to communicating signals, such as configuration signals, throughout integrated circuit chips.

BACKGROUND OF THE INVENTION

Many electronic systems, such as computer systems, have devices that are dynamically configurable. For example, a chip set can be configured by a processor based on the capabilities of the associated computer system. Other devices within a computer system and other electronic systems can also be dynamically configured.

Typical configuration sequences include one or more operations that have configuration words and/or configuration data. The configuration word(s) and data are received by the device being configured and distributed to one or more local configuration registers. Because a device can have multiple local configuration registers that receive configuration word(s) and configuration data, the various local configuration registers can complete the configuration process at different times. If a device continues normal operation after receiving the configuration sequence, different portions of the device can operate with different configurations, which can result in an operating error.

What is needed is a method and apparatus that allows operations subsequent to a configuration sequence to be performed after the various local configuration registers are properly configured.

SUMMARY OF THE INVENTION

A method and apparatus for communicating configuration sequences throughout one or more integrated circuit chips is described. A device receiving a configuration operation determines whether the operation has a configuration word. In one embodiment subsequent operations are caused to retry until the configuration word is communicated to one or more target registers. Configuration data associated with the configuration word is received. Subsequent operations are blocked for a predetermined period of time.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

A method and apparatus for communicating a configuration sequence throughout one or more integrated circuit chips is described. In the following description, for purposes of explanation, numerous specific details are set forth in order to provide a thorough understanding of the present invention. It will be apparent, however, to one skilled in the art that the present invention can be practiced without these specific details. In other instances, structures and devices are shown in block diagram form in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides a method and apparatus for communicating one or more configuration operations to multiple configuration registers residing on one or more integrated circuit (IC) chips. Briefly, the present invention receives a configuration operation having a configuration word. The configuration word is stored in a defer register until the configuration word can be communicated to one or more target local configuration registers, which are the registers in which the configuration word is to be stored and/or used.

During the time period during which the configuration word is stored in the defer register, subsequent operations including operations having configuration data associated with the configuration word are delayed. In one embodiment, operations are caused to retry if a configuration word is stored in the defer register. The configuration data associated with the configuration word is received after the defer register has been cleared. After the configuration data has been received, subsequent operations are blocked for a predetermined period of time. In one embodiment, the device being configured causes devices issuing operations to halt issuance of subsequent operations during the predetermined period of time.

Figure 1:
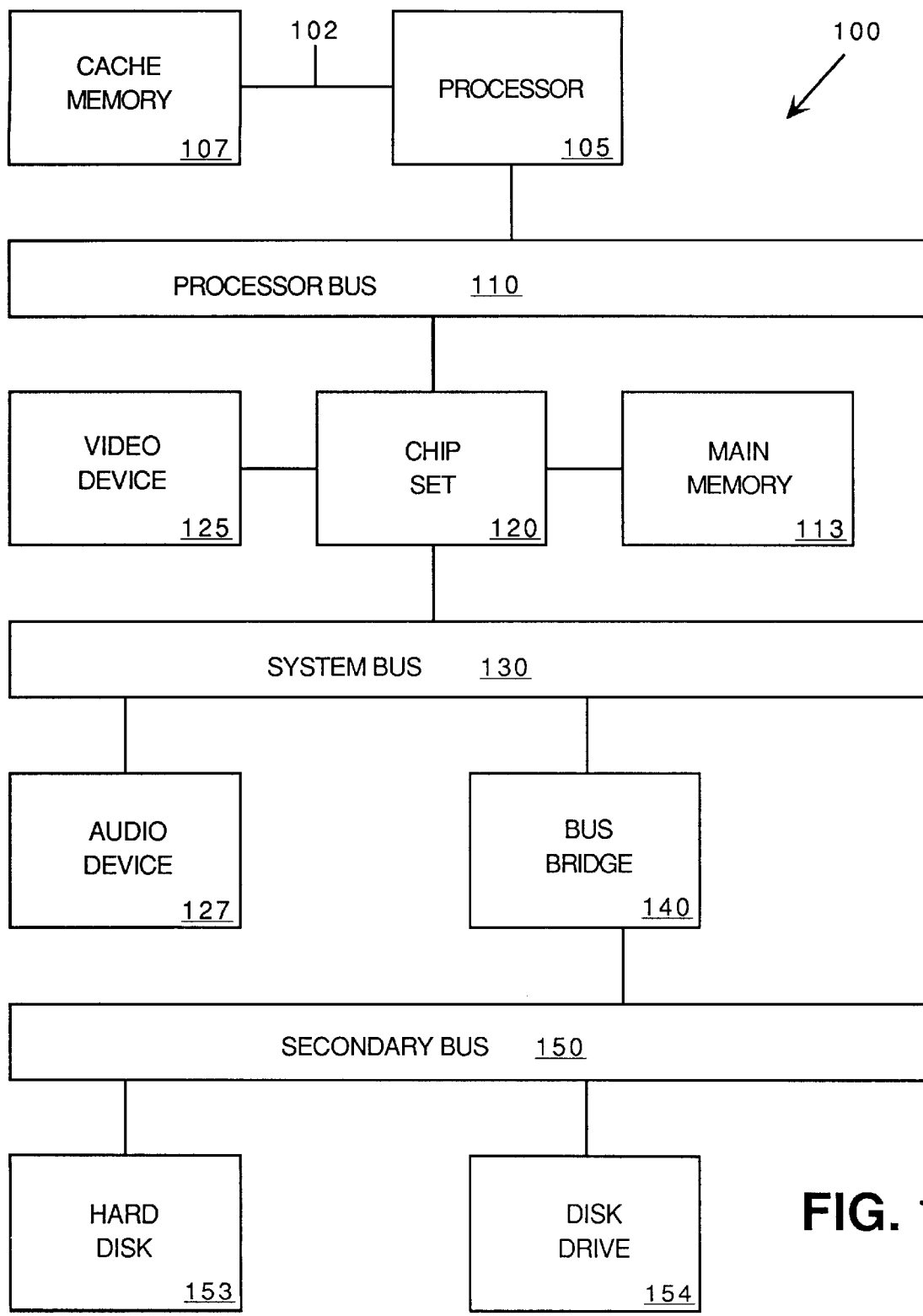
FIG. 1 is a block diagram of a computer system suitable for use with the present invention.

FIG. 1 is one embodiment of a computer system. Computer system 100 includes processor 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the 440BX chip set available from Intel Corporation; however, other chip sets can also be used. Main memory 113 is coupled to processor bus 110 through chip set 120. Main memory 113 and cache memory 107 store sequences of instructions that are executed by processor 105. In one embodiment, main memory 113 includes dynamic random access memory (DRAM); however, main memory 113 may have other configurations. The sequences of instructions executed by processor 105 may be retrieved from main memory 113, cache memory 107, or any other storage device.

Additional devices may also be coupled to processor bus 110, such as multiple processors and/or multiple main memory devices. In one embodiment a digital signal processor (not shown in FIG. 1) is coupled to processor bus 110. Computer system 100 is described in terms of a single processor; however, multiple processors can be coupled to processor bus 110. Video device 125 is also coupled to chip set 120. In one embodiment, video device includes a video monitor such as a cathode ray tube (CRT) or liquid crystal display (LCD) and necessary support circuitry.

Processor bus 110 is coupled to system bus 130 by chip set 125. In one embodiment, system bus 130 is a Peripheral Component Interconnect (PCI) standard bus; however, other bus standards may also be used. Multiple devices, such as audio device 127, may be coupled to system bus 130.

Bus bridge 140 couples system bus 130 to secondary bus 150. In one embodiment, secondary bus 150 is an Industry Standard Architecture (ISA) bus; however, other bus standards may also be used, for example Extended Industry Standard Architecture (EISA). Multiple devices, such as hard disk 153 and disk drive 154 may be coupled to secondary bus 150. Other devices, such as cursor control devices (not shown in FIG. 1), may be coupled to secondary bus 150.

Figure 2:
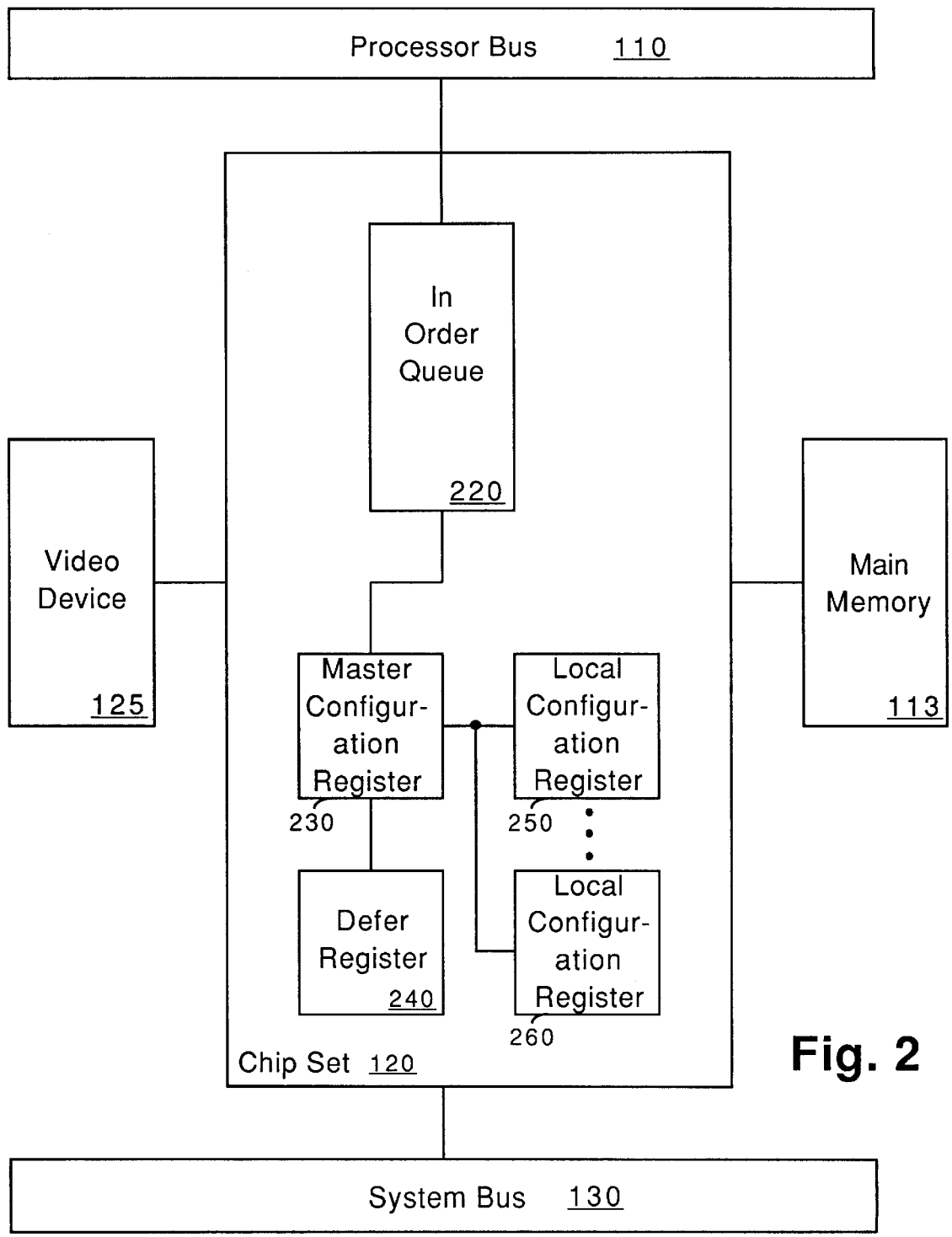
FIG. 2 is a block diagram of a chip set having multiple configuration registers.

FIG. 2 is a block diagram of a chip set having multiple configuration registers. The components of chip set 120 described with respect to FIG. 2 can be part of a single IC or distributed across multiple ICs. Chip set 120 can include multiple IC chips each of which include the components described with respect to FIG. 2. Notwithstanding being described with respect to a chip set, the present invention is equally applicable to other devices or sets of devices.

In order queue 220 receives operations and/or data from processor bus 110, video device 125, main memory 113 and system bus 130. FIG. 2 shows in order queue 220 coupled only to processor bus 110 for reasons of simplicity. Hereafter, operations will be described as being received from processor bus 110; however, the description of operations received from processor bus 110 applies equally to operations received from main memory 113 and system bus 130, or other sources.

In order queue 220 stores operations in the order received from the multiple devices coupled to in order queue 220. Thus, in order queue maintains operation ordering for the devices coupled to chip set 120. Operations are removed from in order queue 220 as processing of the operation is completed.

If an operation is a configuration operation, data from the configuration operation is stored in master configuration register 230. In one embodiment, configuration operations include at least one configuration word from a set of one or more configuration words that are used to set configuration of one or more ICs in chip set 120. Alternatively, a configuration operation can be determined by one or more predetermined bits in an operation.

From master configuration register 230, information, such as the configuration word, is communicated to one or more local configuration registers (e.g., 250, 260) that can be distributed across one or more IC chips. The configuration word is also stored in defer register 240. Typically, communication of the configuration word from master configuration register 230 to the local configuration registers does not occur at the same speed for all registers. This disparity can be caused, for example, by differing physical distances over which signals must travel to reach the various local configuration registers. Thus, a period of time exists wherein various components of chip set 120 may be inconsistently configured. The configuration word is stored in defer register 240 during this time period.

In one embodiment defer register 240 stores a single configuration word; however, other register configurations can also be used. In one embodiment, while data is stored in defer register 240, operations sent to in order queue 220 are delayed. In one embodiment, the delay is provided by in order queue 220 causing operations to be retried if defer register 240 is not empty. Alternatively, operations can be blocked if defer register 240 is not empty. Blocking of operations is described in greater detail below. The configuration word is stored in defer register 240 until the configuration word has been communicated to all target local configuration registers (i.e., the configuration registers for which the configuration register is intended).

After the configuration word has propagated to the target configuration registers, in order queue 220 accepts subsequent operations. In one embodiment, one of the subsequent operations includes configuration data associated with the previous configuration word. The configuration data includes data that indicates specific configurations for components of chip set 120.

In one embodiment, chip set 120 blocks subsequent operations for a predetermined period of time after configuration data is received. In one embodiment having components available from Intel Corporation, a BPRI# signal is asserted to block subsequent operations. Of course, other signals could be used with other components. The predetermined period of time during which operations are blocked allows the configuration data to propagate to the local configuration registers. At the end of the predetermined period of time, subsequent operations are no longer blocked and normal operation resumes.

Figure 3:
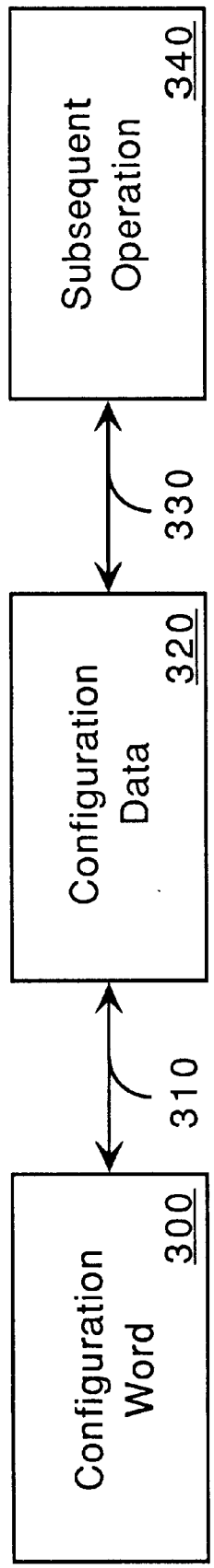
FIG. 3 is a conceptual timeline for receiving configuration sequences according to one embodiment of the present invention.

FIG. 3 is a conceptual timeline for receiving configuration sequences according to one embodiment of the present invention. The timeline of FIG. 3 is intended to provide a conceptual description of the processing of configuration operations according to one embodiment of the present invention. FIG. 3 is not intended to be a temporally scaled representation of receipt of configuration sequences according to the present invention.

Configuration word 300 is received during a first time period. The specific amount of time required to receive and/or decode configuration word 300 is not relevant to the present invention. After configuration word 300 is received, time period 310 passes before configuration data 320 is received. In one embodiment time period 310 is 12–20 clock cycles; however, different time periods can also be used.

In one embodiment, during time period 310, configuration word 300 is stored in a defer register or other register or storage device (not shown in FIG. 3). In one embodiment, time period 310 is determined based, at least in part, on the amount of time required for configuration word 300 to propagate from a master configuration register to one or more target registers. The one or more target registers are not required to reside on a common IC chip with the master configuration register. In one embodiment, during time period 310, incoming operations are delayed, for example, by being caused to retry. Using operation retries to delay operations allows existing mechanisms to be used to delay subsequent operations. Alternatively, subsequent operations can be blocked.

After time period 310, configuration data 320 is received. Configuration data 320 is data to be communicated to the target configuration registers to be used, in association with the configuration word, to configure various devices. In one embodiment, during time period 330, subsequent operations are blocked, for example, by asserting a BPRI# signal in an Intel processor/chip set combination.

Time period 330 allows configuration data 320 to propagate to the target configuration registers. In one embodiment, time period 330 is a predetermined period of time, for example, 20 clock cycles. Alternatively, during time period 330, operations could be delayed, for example, by causing retries. After time period 330 a subsequent operation 340 is received.

Figure 4:
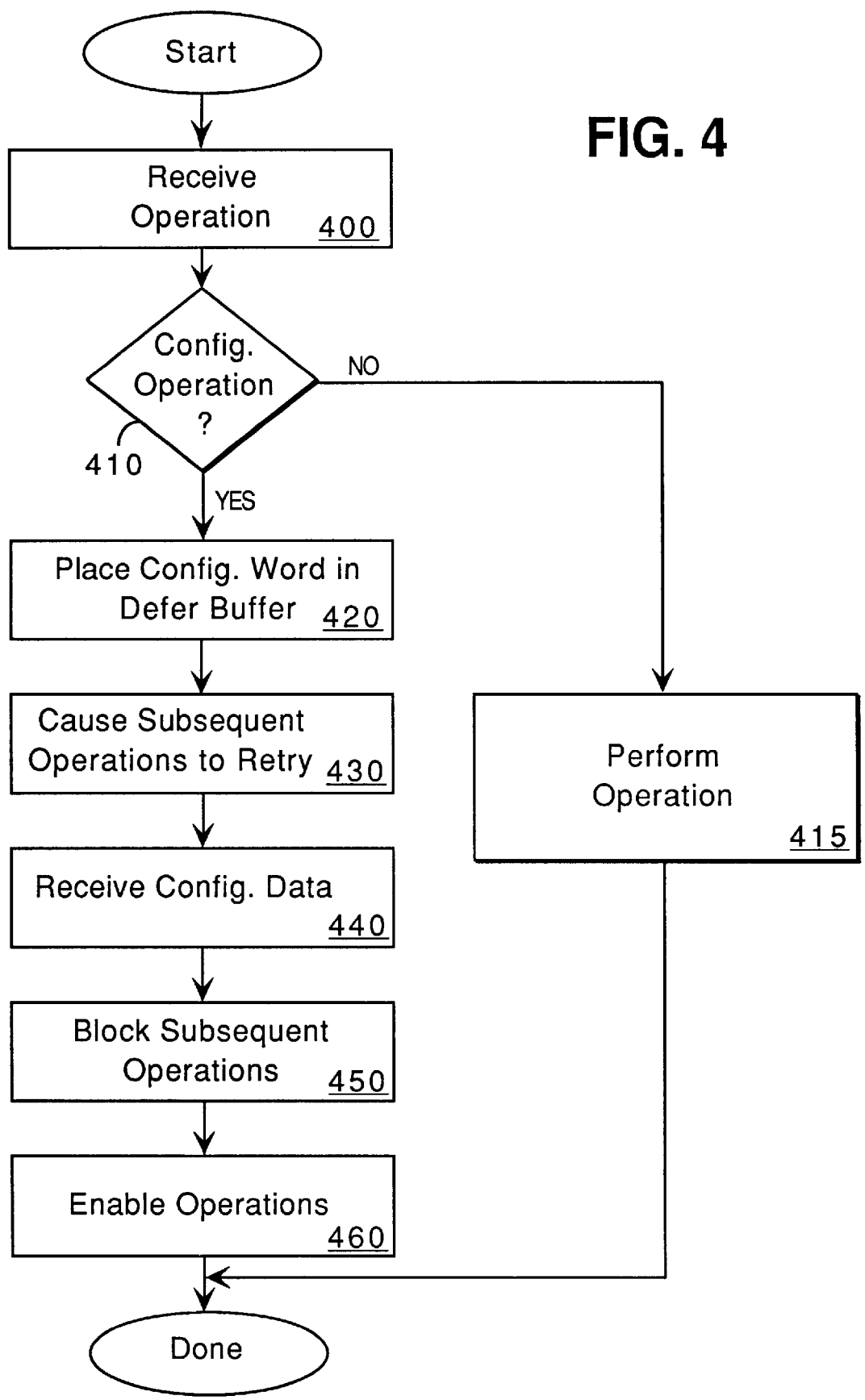
FIG. 4 is a flow diagram for communicating configuration sequence throughout one or more integrated circuit chips.

FIG. 4 is a flow diagram for communicating configuration sequence throughout one or more integrated circuit chips. An operation is received at 400. If the operation is not a configuration operation at 410, the operation is performed in the normal manner at 415. In one embodiment, a configuration operation includes one or more of a predefined set of operation words. If an operation includes one or more of the operations words, that operation is a configuration operation. Configuration operations can be determined in another manner, for example, by checking particular bits or by checking particular register flags.

If an operation is a configuration operation at 410, the configuration word is stored in a defer buffer at 420. In one embodiment, subsequent operations are caused to retry at 430 while a configuration word is stored in the defer buffer. Alternatively, subsequent operations can be caused to retry for a predetermined period of time or subsequent operations can be blocked either while a configuration word is stored in the defer register or for a predetermined period of time.

Configuration data is received at 440. In one embodiment, configuration sequences include both a configuration operation having a configuration word and a subsequent configuration operation having configuration data associated with the previous configuration word. In one embodiment, operations issued after the configuration data is received are blocked for a predetermined period of time at 450. Alternatively, subsequent operations can be caused to retry. At the end of the predetermined period of time subsequent operations are enabled at 460.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method for communicating a configuration sequence throughout one or more integrated circuit chips having target registers, the method comprising:

determining whether an operation has a configuration word;

causing subsequent operations to be retried until the configuration word is communicated to one or more target registers;

receiving configuration data associated with the configuration word; and blocking subsequent operations for a predetermined period of time.

2. The method of claim 1 wherein causing subsequent operations to be retried further comprises:

storing the configuration word in a defer register; and causing subsequent operations to be retried if the defer register is not empty.

3. The method of claim 1 wherein blocking subsequent operations further comprises asserting a signal for the predetermined period of time that causes components external to the integrated circuit chip to withhold issuance of subsequent operations if the signal is asserted.

4. The method of claim 1 wherein the one or more target registers are distributed across multiple integrated circuit chips.

5. An apparatus comprising:

a bus;

a digital signal processor coupled to the bus;

a processor coupled to the bus, wherein the processor issues configuration operations having a configuration word; and a device having one or more configuration registers, the device coupled to the bus, wherein the device receives a configuration operation and causes subsequent operations to be retried until the configuration word is communicated to the one or more configuration registers, wherein the device receives configuration data associated with the configuration word and blocks subsequent operations from issuing for a predetermined period of time.

6. The apparatus of claim 5 further comprising a second device coupled to the device, the second device having one or more configuration registers coupled to receive the configuration word.

7. An apparatus comprising:

a processor to issue configuration operations having an operation word; and a device coupled to the processor, the device configured to receive configuration operations, wherein the device receives a configuration operation and causes subsequent operations to be retried until the configuration word is communicated to the one or more configuration registers, wherein the device receives configuration data associated with the configuration word and blocks subsequent operations from issuing for a predetermined period of time.

8. The apparatus of claim 7, wherein the device further comprises a buffer to store the configuration word while the configuration word is communicated to the one or more configuration registers.

9. The apparatus of claim 7 further comprising a digital signal processor coupled to the bus.

10. The apparatus of claim 7 further comprising a second device coupled to the device, the second device having one or more configuration registers coupled to receive the configuration word.

11. An apparatus comprising:

means for determining whether an operation has a configuration word;

means for causing subsequent operations to be retried until the configuration word is communicated to one or more target registers;

means for receiving configuration data associated with the configuration word; and means for blocking subsequent operations for a predetermined period of time.

12. The apparatus of claim 11 wherein the means for causing subsequent operations to be retried further comprises:

means for storing the configuration word in a defer register; and means for causing subsequent operations to be retried if the defer register is not empty.

13. The apparatus of claim 11 wherein the means for blocking subsequent operations further comprises means for asserting a signal for the predetermined period of time that causes components external to the integrated circuit chip to withhold issuance of subsequent operations if the signal is asserted.

14. The apparatus of claim 11 wherein the one or more target registers are distributed accross multiple integrated circuit chips.

* * * * *